(12) United States Patent
Liao

(10) Patent No.: US 9,885,875 B2
(45) Date of Patent: Feb. 6, 2018

(54) STEREOSCOPIC DISPLAY APPARATUS

(71) Applicant: Shenzhen China Star Optoelectronics Technology Co., Ltd., Shenzhen, Guangdong (CN)

(72) Inventor: Qiaosheng Liao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 242 days.

(21) Appl. No.: 14/407,928

(22) PCT Filed: Nov. 21, 2014

(86) PCT No.: PCT/CN2014/091881
§ 371 (c)(1),
(2) Date: Dec. 12, 2014

(87) PCT Pub. No.: WO2016/074273
PCT Pub. Date: May 19, 2016

(65) Prior Publication Data
US 2016/0274371 A1 Sep. 22, 2016

(30) Foreign Application Priority Data
Nov. 14, 2014 (CN) .......................... 2014 1 0649652

(51) Int. Cl.
*G02B 27/22* (2006.01)
*G02F 1/1335* (2006.01)
(Continued)

(52) U.S. Cl.
CPC ......... *G02B 27/2214* (2013.01); *G02B 27/22* (2013.01); *G02F 1/1339* (2013.01);
(Continued)

(58) Field of Classification Search
CPC .............. G02B 27/22; G02F 1/133526; H04N 13/0228; H04N 13/0404
See application file for complete search history.

(56) References Cited

U.S. PATENT DOCUMENTS 8,319,828 B2  11/2012  Kim et al.
2008/0074742 A1  3/2008  Kim et al.
(Continued)

FOREIGN PATENT DOCUMENTS

CN   101895777A A   11/2010
CN   202929230U U   5/2013
(Continued)

*Primary Examiner* — Jessica M Merlin
(74) *Attorney, Agent, or Firm* — Andrew C. Cheng

(57) ABSTRACT

The present invention provides a stereoscopic display apparatus, which comprises: a grating lens comprising a plurality of grating lens units; a 2D display apparatus disposed in the range of a focal distance of the grating lens; a spacing glass disposed between the 2D display apparatus and the grating lens; and at least one lens array disposed neighbor with the spacing glass and between the 2D display apparatus and the grating lens, for converging light emitted from the 2D display apparatus so that the focal distance of the grating lens in the stereoscopic display apparatus is shortened, and therefore a depth of the spacing glass is reduced, wherein the lens array comprises a plurality of lens units being one-by-one correspondence to the grating lens units. By the solution provided above, the present invention reduces the depth and weight of the stereoscopic display apparatus.

14 Claims, 3 Drawing Sheets

(51) Int. Cl.
*G02F 1/1339* (2006.01)
*G02F 1/1333* (2006.01)
(52) U.S. Cl.
CPC .. *G02F 1/133514* (2013.01); *G02F 1/133526* (2013.01); *G02F 1/133528* (2013.01); *G02F 2001/133302* (2013.01); *G02F 2001/133531* (2013.01)

(56) References Cited

U.S. PATENT DOCUMENTS

| | | | |
|---|---|---|---|
| 2010/0271290 A1 | 10/2010 | Tomisawa et al. | |
| 2012/0313841 A1* | 12/2012 | Ohbitsu | H04N 13/0404 345/32 |
| 2014/0022619 A1* | 1/2014 | Woodgate | G02B 27/2214 359/240 |
| 2014/0125928 A1 | 5/2014 | Chen | |
| 2014/0375706 A1* | 12/2014 | Lee | G02B 27/2214 345/697 |
| 2015/0205018 A1 | 7/2015 | Wei | |

FOREIGN PATENT DOCUMENTS

| | | |
|---|---|---|
| JP | 200937079A A | 2/2009 |
| JP | 2014153705A A | 8/2014 |

* cited by examiner

STEREOSCOPIC DISPLAY APPARATUS

FIELD OF THE INVENTION

The present invention relates to a technique field of liquid crystal, and more particularly to a stereoscopic display apparatus.

BACKGROUND OF THE INVENTION

As improvement on technology and standard of living, a stereoscopic display apparatus, such as 3D (Dimension) display apparatus is widely applied in life. Wherein, light is projected to different locations in space through lens by the stereoscopic display apparatus to form different viewpoints in the horizontal direction, and human eyes feels a 3D effect from binocular parallax effect occurred at the time when left and right eyes are at different viewpoints.

However, the depth of the conventional stereoscopic display apparatus is big and therefore the stereoscopic display apparatus is heavy. When the weight of the stereoscopic display apparatus, especially for those one with large scale, is so heavy that a lot of vigor is needed for moving the stereoscopic display apparatus, it would be a bad experience to the users.

In summary, it is necessary to provide a stereoscopic display apparatus to solve the problem mentioned above.

SUMMARY OF THE INVENTION

The main technique problem to be solved by the invention is to provide a stereoscopic display apparatus capable to reduce the depth and weight of the stereoscopic display apparatus.

In order to solve the technique problem mentioned above, one technique solution adopted by the present invention is to provide a stereoscopic display apparatus comprising: a grating lens comprising a plurality of grating lens units; a 2D display apparatus disposed in the range of a focal distance of the grating lens; a spacing glass disposed between the 2D display apparatus and the grating lens; at least one lens array disposed neighbor with the spacing glass and between the 2D display apparatus and the grating lens, for converging light emitted from the 2D display apparatus so that the focal distance of the grating lens in the stereoscopic display apparatus is shortened, and therefore a depth of the spacing glass is reduced, wherein the lens array comprises a plurality of lens units being one-by-one correspondence to the grating lens units, wherein a width of the lens unit is less than the width of the grating lens unit; the at least one lens array being disposed at one side of the 2D display apparatus for converging light emitted from the 2D display apparatus so that the focal distance of the grating lens in the stereoscopic display apparatus is shortened; and the lens unit of the at least one lens array being a convex lens.

Wherein, the spacing glass is disposed at one side of the at least one lens array away from the 2D display apparatus for maintaining a path of light projected by the at least one lens array.

Wherein, the 2D display apparatus comprises: a down polaroid and an up polaroid disposed at intervals; a down glass substrate and an up glass substrate disposed at intervals, wherein the down glass substrate is disposed near the down polaroid, and the up glass substrate is disposed near the up polaroid; a conductive layer and a colour resist layer being disposed at intervals, wherein the conductive layer is disposed near the down glass substrate, and the colour resist layer is disposed near the up glass substrate; and a liquid crystal layer being disposed between the conductive layer and the colour resist layer, wherein the up polaroid is disposed near the grating lens.

In order to solve the technique problem mentioned above, another technique solution adopted by the present invention is to provide a stereoscopic display apparatus comprising: a grating lens comprising a plurality of grating lens units; a 2D display apparatus disposed in the range of a focal distance of the grating lens; a spacing glass disposed between the 2D display apparatus and the grating lens; at least one lens array disposed neighbor with the spacing glass and between the 2D display apparatus and the grating lens, for converging light emitted from the 2D display apparatus so that the focal distance of the grating lens in the stereoscopic display apparatus is shortened, and therefore a depth of the spacing glass is reduced, wherein the lens array comprises a plurality of lens units being one-by-one correspondence to the grating lens units, wherein a width of the lens unit is less than the width of the grating lens unit; the at least one lens array being a first lens array and a second lens array, and the spacing glass being disposed between the first lens array and the second lens array; and the lens unit of the at least one lens array being a convex lens.

Wherein, the 2D display apparatus comprises: a down polaroid and an up polaroid disposed at intervals; a down glass substrate and an up glass substrate disposed at intervals, wherein the down glass substrate is disposed near the down polaroid, and the up glass substrate is disposed near the up polaroid; a conductive layer and a colour resist layer being disposed at intervals, wherein the conductive layer is disposed near the down glass substrate, and the colour resist layer is disposed near the up glass substrate; and a liquid crystal layer being disposed between the conductive layer and the colour resist layer, wherein the up polaroid is disposed near the grating lens.

In order to solve the technique problem mentioned above, the other technique solution adopted by the present invention is to provide a stereoscopic display apparatus comprising: a grating lens comprising a plurality of grating lens units; a 2D display apparatus disposed in the range of a focal distance of the grating lens; a spacing glass disposed between the 2D display apparatus and the grating lens; and at least one lens array disposed neighbor with the spacing glass and between the 2D display apparatus and the grating lens, for converging light emitted from the 2D display apparatus so that the focal distance of the grating lens in the stereoscopic display apparatus is shortened, and therefore a depth of the spacing glass is reduced, wherein the lens array comprises a plurality of lens units being one-by-one correspondence to the grating lens units.

Wherein, a width of the lens unit is less than the width of the grating lens unit.

Wherein, the at least one lens array is disposed at one side of the 2D display apparatus for converging light emitted from the 2D display apparatus so that the focal distance of the grating lens in the stereoscopic display apparatus is shortened.

Wherein, the spacing glass is disposed at one side of the at least one lens array away from the 2D display apparatus for maintaining a path of light projected by the at least one lens array.

Wherein, the spacing glass is disposed at one side of the 2D display apparatus for maintaining a path of light projected by the 2D display apparatus.

Wherein, the at least one lens array is disposed at one side of the spacing glass away from the 2D display apparatus for converging the paths of light projected by the spacing glass so that the focal distance of the grating lens in the stereoscopic display apparatus is shortened.

Wherein, the at least one lens array is a first lens array and a second lens array, and the spacing glass is disposed between the first lens array and the second lens array.

Wherein, the at least one lens array is formed on the spacing glass so that the at least one lens array and the spacing glass are integrated into one piece.

Wherein, the lens unit of the at least one lens array is a convex lens.

Wherein, the 2D display apparatus comprises: a down polaroid and an up polaroid disposed at intervals; a down glass substrate and an up glass substrate disposed at intervals, wherein the down glass substrate is disposed near the down polaroid, and the up glass substrate is disposed near the up polaroid; a conductive layer and a colour resist layer being disposed at intervals, wherein the conductive layer is disposed near the down glass substrate, and the colour resist layer is disposed near the up glass substrate; and a liquid crystal layer being disposed between the conductive layer and the colour resist layer, wherein the up polaroid is disposed near the grating lens.

The efficacy of the present invention is that, different from the prior arts, the stereoscopic display apparatus in the present invention comprises a grating lens having a plurality of grating lens units, a spacing glass, at least one lens array and a 2D display apparatus disposed in the range of the focal distance of the grating lens; the spacing glass being disposed between the 2D display apparatus and the grating lens; and the at least one lens array being disposed neighbor with the spacing glass and between the 2D display apparatus and the grating lens, wherein the at least one lens array converges light emitted from the 2D display apparatus in order to shorten the focal distance of the grating lens in the stereoscopic display apparatus so that the depth of the spacing glass and the weight of the stereoscopic display apparatus can be reduced, and the experience of the users can be effectively improved.

DETAILED DESCRIPTION OF PREFERRED EMBODIMENTS

Drawings and embodiments are combined to describe the present invention in detail as follows.

Figure 1:
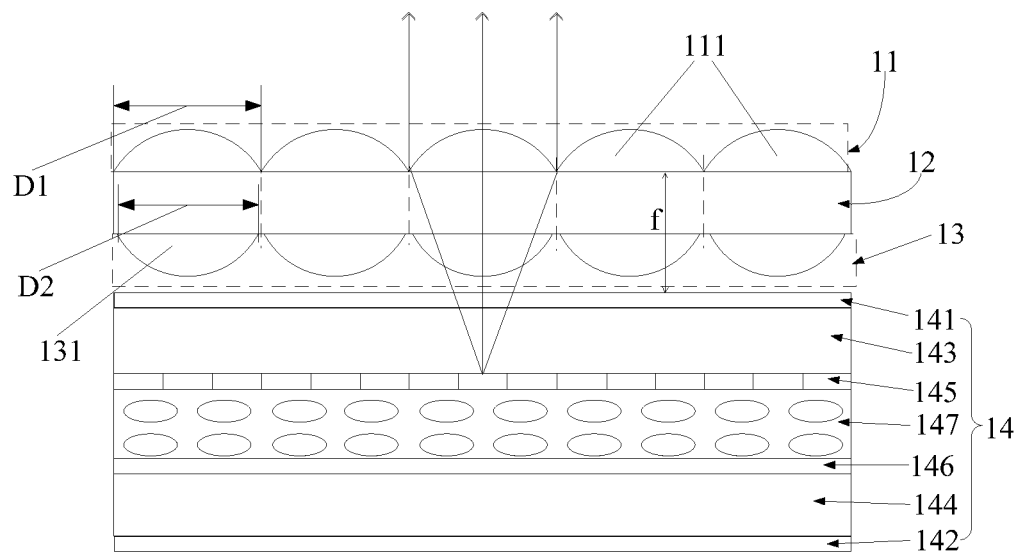
FIG. 1 is a structural schematic diagram of a stereoscopic display apparatus according to a first embodiment of the present invention.

As shown in FIG. 1, FIG. 1 is a structural schematic diagram of a stereoscopic display apparatus according to a first embodiment of the present invention. The stereoscopic display apparatus is preferable a 3D display apparatus, wherein the stereoscopic display apparatus comprises a grating lens 11, a spacing glass 12, at least one lens array 13 and a 2D display apparatus 14. The at least one lens array 13 can be one lens array, two lens arrays, three lens arrays, four lens arrays or more lens arrays.

In the embodiment, the 2D display apparatus 14 is disposed in the range of focal distance f of the grating lens 11. Preferably, the 2D display apparatus 14 is disposed at the focal distance f of the grating lens 11. It should be noted that, in other embodiment, the 2D display apparatus 14 also can be disposed out of the range of the focal distance f of the grating lens 11.

The 2D display apparatus 14 comprises an up polaroid 141, a down polaroid 142, an up glass substrate 143, a down glass substrate 144, a colour resist layer 145, a conductive layer 146 and a liquid crystal layer 147. The up polaroid 141 and the down polaroid 142 are disposed at intervals, and the up polaroid 141 is disposed near the grating lens 11. The up glass substrate 143 and the down glass substrate 144 are disposed at intervals, the down glass substrate 144 is disposed near the down polaroid 142, and the up glass substrate 143 is disposed near the up polaroid 141. The colour resist layer 145 and the conductive layer 146 are disposed at intervals, the conductive layer 146 is disposed near the down glass substrate 144, and the colour resist layer is disposed near the up glass substrate 143. The liquid crystal layer 147 is disposed between the conductive layer 146 and the colour resist layer 145. The liquid crystal layer 147 is disposed between the conductive layer 146 and the colour resist layer 145. Wherein, the colour resist layer 145 is composed of sub-pixels of three colors: red, green and blue, and the conductive layer 146 is a conductive glass layer.

The spacing glass 12 is a transparent layer and is disposed between the 2D display apparatus 14 and the grating lens 11.

The at least one lens array 13 is disposed neighbor with the spacing glass 12, and is disposed between the 2D display apparatus 14 and the grating lens 11. The at least one lens array 13 is used for converging light emitted from the 2D display apparatus 14 in order to shorten the focal distance f of the grating lens 11 in the stereoscopic display apparatus so that the effect of reducing the depth of the stereoscopic display apparatus.

In the embodiment, the grating lens 11 comprises a plurality of grating lens units 111, and the lens array 13 comprises a plurality of lens units 131. Wherein, the grating lens units 111 and the lens units 131 are one-by-one correspondence to each other. Preferably, the width D2 of the lens unit 131 is less than the width D1 of the grating lens unit 111 so that light from the lens unit 131 can be projected onto the grating lens unit 111. It is noted that, the difference between the width D2 of the lens unit 131 and the width D1 of the grating lens unit 111 would not affect the image quality issue of the stereoscopic display apparatus in the real application.

In the embodiment, the at least one lens array 13 is disposed at one side of the 2D display apparatus 14 for converging light emitted from the 2D display apparatus 14. The spacing glass 12 is disposed at one side of the lens array 13 away from the 2D display apparatus 14 for maintaining a path of light projected from the at least one lens array 13. That is, light emitted from the 2D display apparatus 14 is converged by the at least one lens array 13 to shorten the focal distance of the grating lens 11 in the stereoscopic display apparatus 14, after that, the path of light projected from the lens array 13 is maintained by the spacing glass 12, and, finally, light is projected by the grating lens 11.

Figure 2:
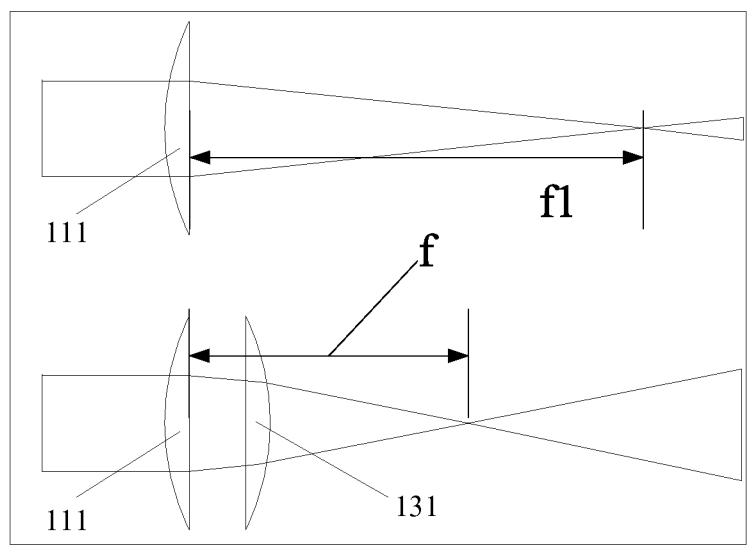
FIG. 2 is a schematic diagram of operation theory of the lens array shown in FIG. 1.

Wherein, the lens unit 131 of the at least one lens array 13 and the grating lens unit 111 are convex lenses. The lens unit 131 is capable of converging light. Therefore, light emitted from the 2D display apparatus 14 can be converged by the at least one lens array 13 so that the focal distance f of the grating lens 11 in the stereoscopic display apparatus is shortened. Specifically, the focal distance f of the grating lens 11 in the stereoscopic display apparatus after joining the at least one lens array 13 into the stereoscopic display apparatus is shorter than the focal distance f1 without joining the at least one lens array 13 into the stereoscopic display apparatus, as shown in FIG. 2. Therefore, the depth of the spacing glass 12 can be reduced by joining the at least one lens array 13 so as to further reduce the depth and weight of the stereoscopic display apparatus.

In the embodiment, the grating lens unit 111 is a convex lens having a convex surface, and the grating lens unit 111 with the convex surface is disposed away from the 2D display apparatus 14. The lens unit 131 is a convex lens having a convex surface, and the lens unit 131 with the convex surface is disposed near the 2D display apparatus 14. Obviously, in other embodiments, the lens unit 131 with the convex surface can be disposed away from the 2D display apparatus 14. It is noted that, the lens unit 131 is not limited to the convex lens having one convex surface, the lens unit 131 could be a convex lens with both sides are convex surfaces, or other lens unit capable of convergence.

Figure 3:
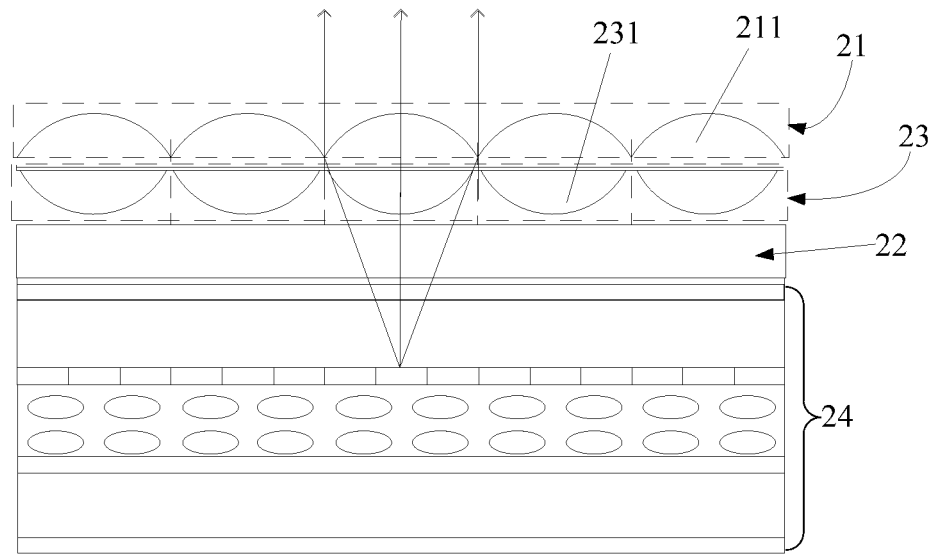
FIG. 3 is a structural schematic diagram of a stereoscopic display apparatus according to a second embodiment of the present invention.

As showing in FIG. 3, FIG. 3 is a structural schematic diagram of a stereoscopic display apparatus according to a second embodiment of the present invention. The 2D display apparatus 24 and the grating lens 21 in FIG. 3 are one-by-one corresponding to the 2D display apparatus 14 and the grating lens 11 in FIG. 1. The main difference between the stereoscopic display apparatus in FIG. 3 and the stereoscopic display apparatus in FIG. 1 is: the spacing glass 22 is disposed at one side of the 2D display apparatus 24 for maintaining the path of light emitted from the 2D display apparatus 24. The at least one lens array 23 is disposed at one side of the spacing glass 22 away from the 2D display apparatus 24 for converging paths of light projected by the spacing glass 22 so as to reduce the focal distance of the grating lens 21 in the stereoscopic display apparatus 24. Specifically, the light emitted from the 2D display apparatus 24 passes through the spacing glass 22, the spacing glass 22 maintains the path of light emitted from the 2D display apparatus 24, after that, light is converged by the at least one lens array 23 to shorten the focal distance of the grating lens 21 in the stereoscopic display apparatus, and, finally, light is projected by the grating lens 21.

Figure 4:
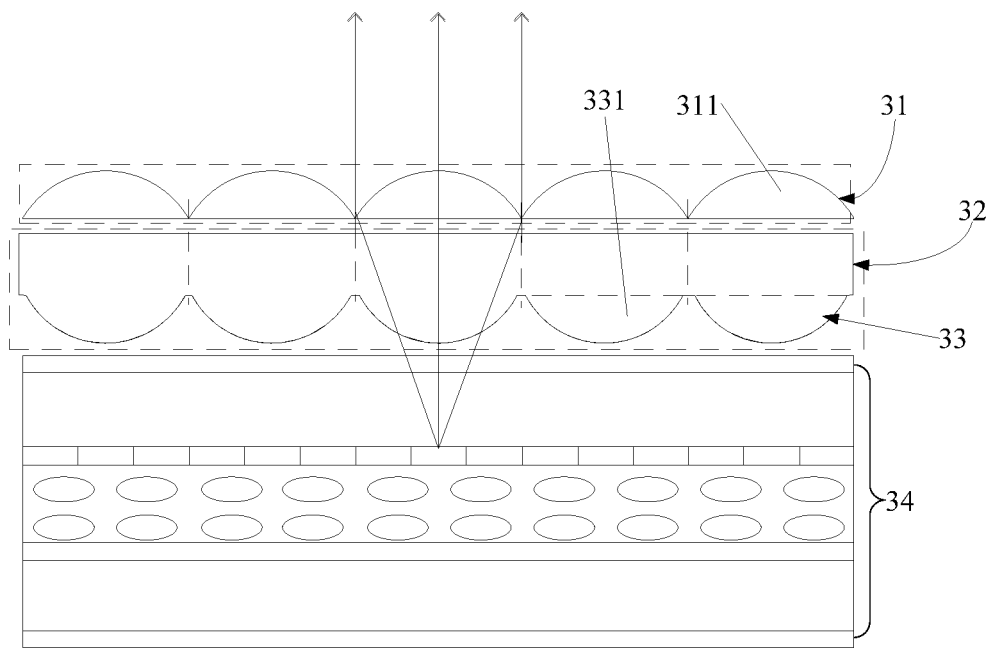
FIG. 4 is a structural schematic diagram of a stereoscopic display apparatus according to a third embodiment of the present invention.

As shown in FIG. 4, FIG. 4 is a structural schematic diagram of a stereoscopic display apparatus according to a third embodiment of the present invention. The 2D display apparatus 34 and the grating lens 31 in FIG. 4 are one-by-one corresponding to the 2D display apparatus 14 and the grating lens 11 in FIG. 1. The main difference between the stereoscopic display apparatus in FIG. 4 and the stereoscopic display apparatus in FIG. 1 is: the at least one lens array 33 is formed on the spacing glass 32 so that the at least one lens array 33 and the spacing glass 32 are integrated into one piece. Through forming the at least one lens array 33 on the spacing glass 32, the at least one lens array 33 and the spacing glass 32 having the function of convergence can be manufactured directly by one mold so as to reduce the manufacturing cost.

Figure 5:
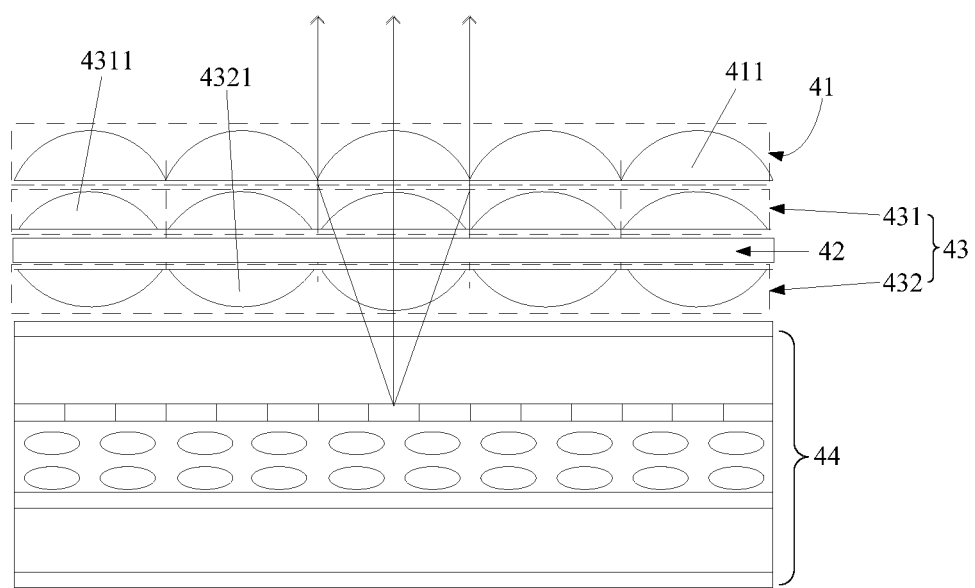
FIG. 5 is a structural schematic diagram of a stereoscopic display apparatus according to a fourth embodiment of the present invention.

As shown in FIG. 5, FIG. 5 is a structural schematic diagram of a stereoscopic display apparatus according to a fourth embodiment of the present invention. The 2D display apparatus 44 and the grating lens 41 in FIG. 5 are one-by-one corresponding to the 2D display apparatus 14 and the grating lens 11 in FIG. 1. The main difference between the stereoscopic display apparatus in FIG. 5 and the stereoscopic display apparatus in FIG. 1 is: the at least one lens array 43 is a first lens array 431 and a second lens array 432, and the spacing glass 42 is disposed between the first lens array 431 and the second lens array 432.

Wherein, the lens units 4311 of the first lens array 431, the lens units 4321 of the second lens array 432 and the grating lens units 411 of the grating lens 41 are one-by-one corresponding to each other, i.e., the grating lens units 411 of the grating lens 41 are one-by-one correspondence to the lens units 4311 of the first lens array 431, and the lens units 4311 of the first lens array 431 are one-by-one correspondence to the lens units 4321 of the second lens array 432.

In the embodiment, the width of the lens unit 4311 of the first lens array 431 is less than the width of the grating lens unit 411 of the grating lens 41 so that all or major part of light entered from the lens unit 4311 of the first lens array 431 can be projected onto the grating lens unit 411; and the width of the lens unit 4321 of the second lens array 432 is less than the width of the lens unit 4311 of the first lens array 431 so that all or major part of light entered from the lens unit 4321 of the second lens array 432 can be projected onto the lens units 4311 of the first lens array 431. It should be noted that, the difference between the width of the lens unit 4311 of the first lens array 431 and the width of the grating lens unit 411, and the difference between the width of the lens unit 4321 of the second lens array 432 and the width of the lens unit 4311 of the first lens array 431 would not affect the image quality issue of the stereoscopic display apparatus in the real application.

Obviously, in other embodiments, the width of the lens unit 4311 of the first lens array 431 is less than the width of the grating lens unit 411, and the width of the lens unit 4311 of the first lens array 431 is the same as the width of the lens unit 4321 of the second lens array 432.

In summary, the stereoscopic display apparatus in the present invention comprises a grating lens having a plurality of grating lens units, a spacing glass, at least one lens array and a 2D display apparatus disposed in the range of the focal distance of the grating lens; the spacing glass being disposed between the 2D display apparatus and the grating lens; and the at least one lens array being disposed neighbor with the spacing glass and between the 2D display apparatus and the grating lens, wherein the at least one lens array converges light emitted from the 2D display apparatus in order to shorten the focal distance of the grating lens in the stereoscopic display apparatus so that the depth of the spacing glass and the weight of the stereoscopic display apparatus can be reduced, and the experience of the users can be effectively improved.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A stereoscopic display apparatus comprising:
   a grating lens comprising a plurality of grating lens units;
   a 2D display apparatus disposed in the range of a focal distance of the grating lens;
   a spacing glass disposed between the 2D display apparatus and the grating lens; and
   at least one lens array disposed neighbor with the spacing glass and between the 2D display apparatus and the grating lens, for converging light emitted from the 2D display apparatus so that the focal distance of the grating lens in the stereoscopic display apparatus is shortened, and therefore a depth of the spacing glass is reduced, wherein the lens array comprises a plurality of lens units being one-by-one correspondence to the grating lens units;

wherein a width of the lens unit is less than the width of the grating lens unit, and only one of the lens units is disposed under a corresponded one of the grating lens units in a direction along which the width of the lens unit is less than the width of the grating lens unit;

the at least one lens array being disposed at one side of the 2D display apparatus for converging light emitted from the 2D display apparatus so that the focal distance of the grating lens in the stereoscopic display apparatus is shortened;

the lens unit of the at least one lens array being a convex lens.

2. The stereoscopic display apparatus according to claim 1, wherein the spacing glass is disposed at one side of the at least one lens array away from the 2D display apparatus for maintaining a path of light projected by the at least one lens array.

3. The stereoscopic display apparatus according to claim 2, wherein the 2D display apparatus comprises:
a down polaroid and an up polaroid disposed at intervals;
a down glass substrate and an up glass substrate disposed at intervals, wherein the down glass substrate is disposed near the down polaroid, and the up glass substrate is disposed near the up polaroid;
a conductive layer and a colour resist layer being disposed at intervals, wherein the conductive layer is disposed near the down glass substrate, and the colour resist layer is disposed near the up glass substrate; and
a liquid crystal layer being disposed between the conductive layer and the colour resist layer;
wherein the up polaroid is disposed near the grating lens.

4. A stereoscopic display apparatus comprising:
a grating lens comprising a plurality of grating lens units;
a 2D display apparatus disposed in the range of a focal distance of the grating lens;
a spacing glass disposed between the 2D display apparatus and the grating lens; and
at least one lens array disposed neighbor with the spacing glass and between the 2D display apparatus and the grating lens, for converging light emitted from the 2D display apparatus so that the focal distance of the grating lens in the stereoscopic display apparatus is shortened, and therefore a depth of the spacing glass is reduced, wherein the lens array comprises a plurality of lens units being one-by-one correspondence to the grating lens units;
wherein a width of the lens unit is less than the width of the grating lens unit, and only one of the lens units is disposed under a corresponded one of the grating lens units in a direction along which the width of the lens unit is less than the width of the grating lens unit;
the at least one lens array being a first lens array and a second lens array, and the spacing glass being disposed between the first lens array and the second lens array;
the lens unit of the at least one lens array being a convex lens.

5. The stereoscopic display apparatus according to claim 4, wherein the 2D display apparatus comprises:
a down polaroid and an up polaroid disposed at intervals;
a down glass substrate and an up glass substrate disposed at intervals, wherein the down glass substrate is disposed near the down polaroid, and the up glass substrate is disposed near the up polaroid;
a conductive layer and a colour resist layer being disposed at intervals, wherein the conductive layer is disposed near the down glass substrate, and the colour resist layer is disposed near the up glass substrate; and
a liquid crystal layer being disposed between the conductive layer and the colour resist layer;
wherein the up polaroid is disposed near the grating lens.

6. A stereoscopic display apparatus comprising:
a grating lens comprising a plurality of grating lens units;
a 2D display apparatus disposed in the range of a focal distance of the grating lens;
a spacing glass disposed between the 2D display apparatus and the grating lens; and
at least one lens array disposed neighbor with the spacing glass and between the 2D display apparatus and the grating lens, for converging light emitted from the 2D display apparatus so that the focal distance of the grating lens in the stereoscopic display apparatus is shortened, and therefore a depth of the spacing glass is reduced, wherein the lens array comprises a plurality of lens units being one-by-one correspondence to the grating lens units;
wherein a width of the lens unit is less than the width of the grating lens unit, and only one of the lens units is disposed under a corresponded one of the grating lens units in a direction along which the width of the lens unit is less than the width of the grating lens unit.

7. The stereoscopic display apparatus according to claim 6, wherein the at least one lens array is disposed at one side of the 2D display apparatus for converging light emitted from the 2D display apparatus so that the focal distance of the grating lens in the stereoscopic display apparatus is shortened.

8. The stereoscopic display apparatus according to claim 7, wherein the spacing glass is disposed at one side of the at least one lens array away from the 2D display apparatus for maintaining a path of light projected by the at least one lens array.

9. The stereoscopic display apparatus according to claim 6, wherein the spacing glass is disposed at one side of the 2D display apparatus for maintaining a path of light projected by the 2D display apparatus.

10. The stereoscopic display apparatus according to claim 9, wherein the at least one lens array is disposed at one side of the spacing glass away from the 2D display apparatus for converging the paths of light projected by the spacing glass so that the focal distance of the grating lens in the stereoscopic display apparatus is shortened.

11. The stereoscopic display apparatus according to claim 6, wherein the at least one lens array is a first lens array and a second lens array, and the spacing glass is disposed between the first lens array and the second lens array.

12. The stereoscopic display apparatus according to claim 6, wherein the at least one lens array is formed on the spacing glass so that the at least one lens array and the spacing glass are integrated into one piece.

13. The stereoscopic display apparatus according to claim 6, wherein the lens unit of the at least one lens array is a convex lens.

14. The stereoscopic display apparatus according to claim 6, wherein the 2D display apparatus comprises:
a down polaroid and an up polaroid disposed at intervals;

a down glass substrate and an up glass substrate disposed at intervals, wherein the down glass substrate is disposed near the down polaroid, and the up glass substrate is disposed near the up polaroid;

a conductive layer and a colour resist layer being disposed at intervals, wherein the conductive layer is disposed near the down glass substrate, and the colour resist layer is disposed near the up glass substrate; and a liquid crystal layer being disposed between the conductive layer and the colour resist layer;

wherein the up polaroid is disposed near the grating lens.

* * * * *